US010171859B2

(12) United States Patent
Busey et al.

(10) Patent No.: US 10,171,859 B2
(45) Date of Patent: Jan. 1, 2019

(54) SYSTEMS, MEDIA, AND METHODS FOR PROVIDING AN ALGORITHMICALLY SORTED WATCHLIST OR WISHLIST

(71) Applicant: BLAB VENTURES LLC, Austin, TX (US)

(72) Inventors: Andrew Thomas Busey, Austin, TX (US); Anthony Dan Chen, Austin, TX (US); Isao Uchida Jonas, Austin, TX (US); Douglas James Daniels, Jr., Austin, TX (US); Benjamin Edward Lamm, Austin, TX (US)

(73) Assignee: BLAB VENTURES LLC, Austin, TX (US)

( * ) Notice: Subject to any disclaimer, the term of this patent is extended or adjusted under 35 U.S.C. 154(b) by 0 days.

(21) Appl. No.: 15/169,537

(22) Filed: May 31, 2016

(65) Prior Publication Data
US 2016/0360253 A1 Dec. 8, 2016

Related U.S. Application Data

(60) Provisional application No. 62/170,434, filed on Jun. 3, 2015.

(51) Int. Cl.
H04H 60/33 (2008.01)
H04N 21/262 (2011.01)
H04N 21/482 (2011.01)
H04N 21/4788 (2011.01)
H04N 21/475 (2011.01)
H04N 21/442 (2011.01)
H04N 21/466 (2011.01)
H04N 21/25 (2011.01)
H04N 21/258 (2011.01)
H04N 21/45 (2011.01)

(52) U.S. Cl.
CPC ..... H04N 21/26258 (2013.01); H04N 21/252 (2013.01); H04N 21/25883 (2013.01); H04N 21/44204 (2013.01); H04N 21/4532 (2013.01); H04N 21/4667 (2013.01); H04N 21/4756 (2013.01); H04N 21/4788 (2013.01); H04N 21/4825 (2013.01); H04N 21/4826 (2013.01)

(58) Field of Classification Search
CPC combination set(s) only.
See application file for complete search history.

(56) References Cited

U.S. PATENT DOCUMENTS

2009/0293079 A1* 11/2009 McKee ................ G06Q 10/105
725/10
2011/0107374 A1* 5/2011 Roberts ............. H04N 5/44543
725/46
2012/0303710 A1* 11/2012 Roberts .................. G06Q 50/01
709/204

* cited by examiner

Primary Examiner — Mulugeta Mengesha
(74) Attorney, Agent, or Firm — Wilson Sonsini Goodrich & Rosati

(57) ABSTRACT

Described are platforms, systems, applications, and methods for algorithmically updating a user configured watchlist or wishlist based on activity of social network connections including: adding an item to a watchlist, consuming or acquiring an item, rating an item, recommending an item, and discussing an item, as well as aggregated activity of a community or population of users within the social network.

27 Claims, 4 Drawing Sheets

SYSTEMS, MEDIA, AND METHODS FOR PROVIDING AN ALGORITHMICALLY SORTED WATCHLIST OR WISHLIST

CROSS-REFERENCE TO RELATED APPLICATIONS

The present application claims the benefit of U.S. Provisional Application No. 62/170,434, filed on Jun. 3, 2015, the entire contents of which are incorporated herein by reference.

BACKGROUND OF THE INVENTION

A wishlist is a personal list of goods, services, or experiences desired by a person. A watchlist is a type of wishlist for media that a person desires to watch.

SUMMARY OF THE INVENTION

Existing wishlists and watchlists fail to incorporate data from a user's connections within social networks to provide updates and revisions to the items in the list or their placement within the list. As such, current technologies fail to adequately utilize the social graph to help a user set priorities and discover new ones. Advantages of the platforms, systems, media, and applications described herein include increased interest, engagement, and discovery provided by tapping into a user's digital community to update and refine items in wishlists and watchlists.

In one aspect, disclosed herein are computer-implemented systems for maintaining an algorithmically sorted watchlist comprising: a digital processing device comprising an operating system configured to perform executable instructions and a memory; a computer program including instructions executable by the digital processing device to create an application comprising: a software module configured to present an interface allowing a first user to create a watchlist comprising a plurality of digital media items, the watchlist having an order indicating a priority for the first user to consume each item; a software module configured to present an interface allowing the first user to rate media items they have consumed; a software module configured to present an interface allowing the first user to recommend one or more consumed media items to a second user, the second user having a social connection to the first user within a social network; a software module configured to present an interface allowing the first user to ask the second user a question pertaining to a media item; a software module configured to present an interface allowing the first user to discuss a media item with the second user; and a software module configured to algorithmically update the watchlist, the update based on user activity including: the second user adding a media item to a watchlist, the second user consuming a media item, the second user rating a media item, the second user recommending a media item, the second user discussing a media item, and aggregated activity of a community of users within the social network. In some embodiments, the media items comprise one or more TV series (e.g., Breaking Bad), TV series seasons (e.g., Breaking Bad Season 2), or TV episodes (e.g., Breaking Bad, Season 2, Episode 3). In some embodiments, the media items comprise one or more movies. In some embodiments, the media items comprise one or more movie trailers. In some embodiments, the media items comprise one or more music videos. In some embodiments, the media items comprise one or more user generated videos. In some embodiments, the watchlist excludes items previously consumed by the first user. In further embodiments, the watchlist excludes items previously rated by the first user. In some embodiments, the update is performed at least once an hour. In further embodiments, the update is performed at least once a minute. In still further embodiments, the update is performed at least once a second. In some embodiments, the community of users within the social network has a scope configurable by the first user. In some embodiments, the social media connection is formed within the application. In other embodiments, the social media connection is imported from one or more third-party social networks. In some embodiments, the update is based on a change in the availability of a media item. In some embodiments, the update comprises one or more selected from the group consisting of: adding an item to the watchlist, removing an item from the watchlist, moving an item higher in the order, and moving an item lower in the order. In some embodiments, the aggregated activity of a community of users comprises an average rate of, or trend in: adding a media item to a watchlist by users of the community, consuming a media item by users of the community, rating a media item by users of the community, recommending a media item by users of the community, or discussing a media item by users of the community. In some embodiments, the software module configured to algorithmically update the watchlist applies a weight to different types of user activity to algorithmically update the watchlist. In some embodiments, the software module configured to algorithmically update the watchlist also updates a user interface of the application to indicate, for each media item, the user activity used to algorithmically update the watchlist.

In another aspect, disclosed herein are non-transitory computer-readable storage media encoded with a computer program including instructions executable by a processor to create an application for maintaining an algorithmically sorted watchlist, the application comprising: a software module configured to present an interface allowing a first user to create a watchlist comprising a plurality of digital media items, the watchlist having an order indicating a priority for the first user to consume each item; a software module configured to present an interface allowing the first user to rate media items they have consumed; a software module configured to present an interface allowing the first user to recommend one or more consumed media items to a second user, the second user having a social connection to the first user within a social network; a software module configured to present an interface allowing the first user to ask the second user a question pertaining to a media item; a software module configured to present an interface allowing the first user to discuss a media item with the second user; and a software module configured to algorithmically update the watchlist, the update based on user activity including: the second user adding a media item to a watchlist, the second user consuming a media item, the second user rating a media item, the second user recommending a media item, the second user discussing a media item, and aggregated activity of a community of users within the social network. In some embodiments, the media items comprise one or more TV series (e.g., Breaking Bad), TV series seasons (e.g., Breaking Bad Season 2), or TV episodes (e.g., Breaking Bad, Season 2, Episode 3). In some embodiments, the media items comprise one or more movies. In some embodiments, the media items comprise one or more movie trailers. In some embodiments, the media items comprise one or more music videos. In some embodiments, the media items comprise one or more user generated videos. In some embodiments, the watchlist excludes items previously consumed by the first user. In further embodiments, the watchlist excludes items previously rated by the first user. In some embodiments, the update is performed at least once an hour. In further embodiments, the update is performed at least once a minute. In still further embodiments, the update is performed at least once a second. In some embodiments, the community of users within the social network has a scope configurable by the first user. In some embodiments, the social media connection is formed within the application. In other embodiments, the social media connection is imported from one or more third-party social networks. In some embodiments, the update is based on a change in the availability of a media item. In some embodiments, the update comprises one or more selected from the group consisting of: adding an item to the watchlist, removing an item from the watchlist, moving an item higher in the order, and moving an item lower in the order. In some embodiments, the aggregated activity of a community of users comprises an average rate of, or trend in: adding a media item to a watchlist by users of the community, consuming a media item by users of the community, rating a media item by users of the community, recommending a media item by users of the community, or discussing a media item by users of the community. In some embodiments, the software module configured to algorithmically update the watchlist applies a weight to different types of user activity to algorithmically update the watchlist. In some embodiments, the software module configured to algorithmically update the watchlist also updates a user interface of the application to indicate, for each media item, the user activity used to algorithmically update the watchlist.

In another aspect, disclosed herein are computer-implemented systems for maintaining an algorithmically sorted wishlist comprising: a digital processing device comprising an operating system configured to perform executable instructions and a memory; a computer program including instructions executable by the digital processing device to create an application comprising: a software module configured to present an interface allowing a first user to create a wishlist comprising a plurality of items, the wishlist having an order indicating a priority for the first user to acquire each item; a software module configured to present an interface allowing the first user to rate items they have acquired; a software module configured to present an interface allowing the first user to recommend one or more acquired items to a second user, the second user having a social connection to the first user within a social network; a software module configured to present an interface allowing the first user to ask the second user a question pertaining to an item; a software module configured to present an interface allowing the first user to discuss an item with the second user; and a software module configured to algorithmically update the wishlist, the update based on user activity including: the second user adding an item to a wishlist, the second user acquiring an item, the second user rating an item, the second user recommending an item, the second user discussing an item, and aggregated activity of a community of users within the social network. In some embodiments, the items comprise one or more goods. In some embodiments, the items comprise one or more services. In some embodiments, the items comprise one or more experiences. In some embodiments, the wishlist excludes items previously acquired by the first user. In further embodiments, the wishlist excludes items previously rated by the first user. In some embodiments, the update is performed at least once an hour. In further embodiments, the update is performed at least once a minute. In still further embodiments, the update is performed at least once a second. In some embodiments, the community of users within the social network has a scope configurable by the first user. In some embodiments, the social media connection is formed within the application. In other embodiments, the social media connection is imported from one or more third-party social networks. In yet other embodiments, the social media connection is based on a contact list uploaded by the user from their phone or computer. In some embodiments, the update is based on a change in the availability of an item. In some embodiments, the update comprises one or more selected from the group consisting of: adding an item to the wishlist, removing an item from the wishlist, moving an item higher in the order, and moving an item lower in the order. In some embodiments, the aggregated activity of a community of users comprises an average rate of, or trend in: adding an item to a wishlist by users of the community, acquiring an item by users of the community, rating an item by users of the community, recommending an item by users of the community, or discussing an item by users of the community. In some embodiments, the software module configured to algorithmically update the wishlist applies a weight to different types of user activity to algorithmically update the wishlist. In some embodiments, the software module configured to algorithmically update the wishlist also updates a user interface of the application to indicate, for each item the user activity used to algorithmically update the wishlist.

In another aspect, disclosed herein are non-transitory computer-readable storage media encoded with a computer program including instructions executable by a processor to create an application for maintaining an algorithmically sorted wishlist, the application comprising: a software module configured to present an interface allowing a first user to create a wishlist comprising a plurality of items, the wishlist having an order indicating a priority for the first user to acquire each item; a software module configured to present an interface allowing the first user to rate items they have acquired; a software module configured to present an interface allowing the first user to recommend one or more acquired items to a second user, the second user having a social connection to the first user within a social network; a software module configured to present an interface allowing the first user to ask the second user a question pertaining to an item; a software module configured to present an interface allowing the first user to discuss an item with the second user; and a software module configured to algorithmically update the wishlist, the update based on user activity including: the second user adding an item to a wishlist, the second user acquiring an item, the second user rating an item, the second user recommending an item, the second user discussing an item, and aggregated activity of a community of users within the social network. In some embodiments, the items comprise one or more goods. In some embodiments, the items comprise one or more services. In some embodiments, the items comprise one or more experiences. In some embodiments, the wishlist excludes items previously acquired by the first user. In further embodiments, the wishlist excludes items previously rated by the first user. In some embodiments, the update is performed at least once an hour. In further embodiments, the update is performed at least once a minute. In still further embodiments, the update is performed at least once a second. In some embodiments, the community of users within the social network has a scope configurable by the first user. In some embodiments, the social media connection is formed within the application. In other embodiments, the social media connection is imported from one or more third-party social network. In yet other embodiments, the social media connection is based on a contact list uploaded by the user from their phone or computer. In some embodiments, the update is based on a change in the availability of an item. In some embodiments, the update comprises one or more selected from the group consisting of: adding an item to the wishlist, removing an item from the wishlist, moving an item higher in the order, and moving an item lower in the order. In some embodiments, the aggregated activity of a community of users comprises an average rate of, or trend in: adding an item to a wishlist by users of the community, acquiring an item by users of the community, rating an item by users of the community, recommending an item by users of the community, or discussing an item by users of the community. In some embodiments, the software module configured to algorithmically update the wishlist applies a weight to different types of user activity to algorithmically update the wishlist. In some embodiments, the software module configured to algorithmically update the wishlist also updates a user interface of the application to indicate, for each item the user activity used to algorithmically update the wishlist.

DETAILED DESCRIPTION OF THE INVENTION

Figure 1:
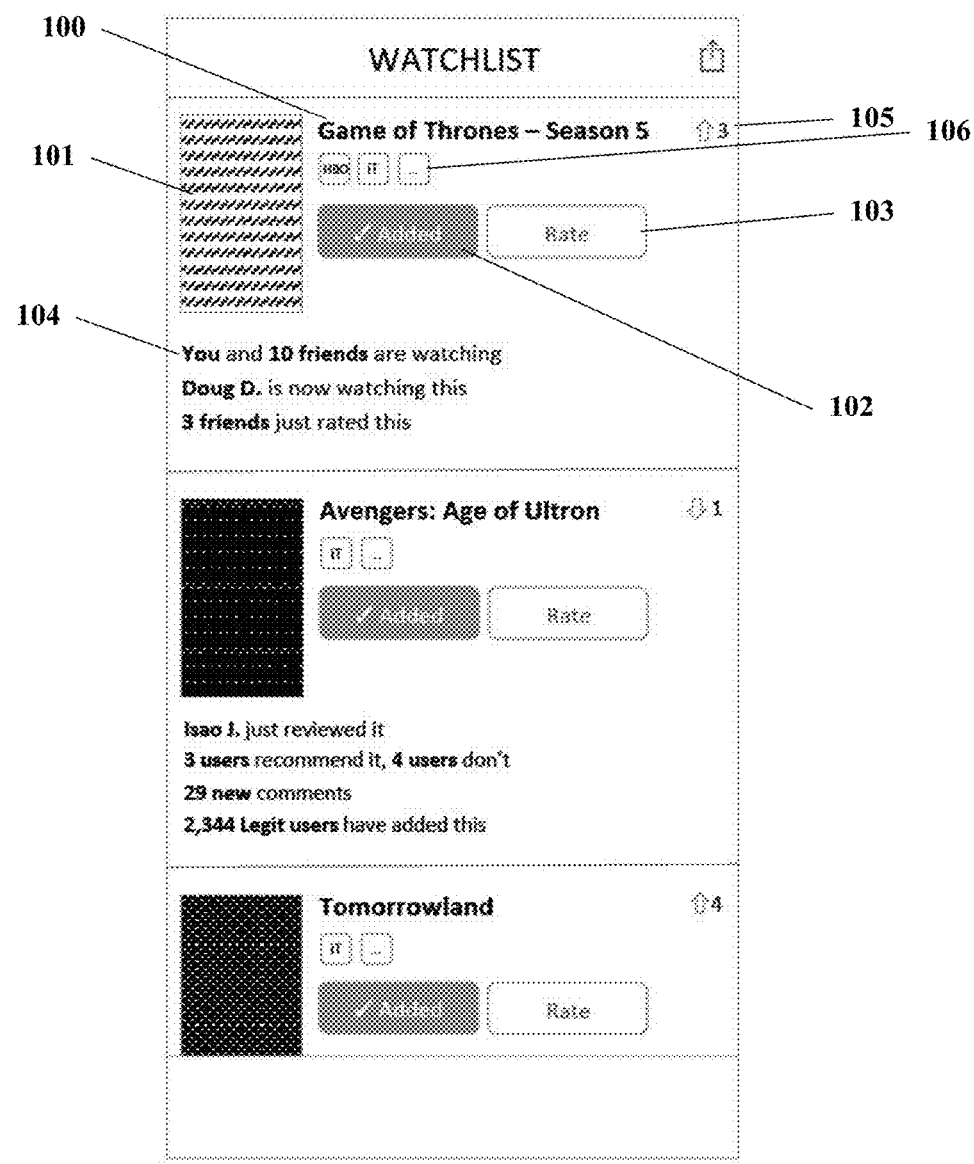
FIG. 1 shows a non-limiting example of a user interface for a watchlist described herein; in this case, a watchlist including a prioritized list of digital media items and, for each item, information pertaining to user activity within a social network used to update the position of the item in the list.

Described herein, in certain embodiments, are computer-implemented systems for maintaining an algorithmically sorted watchlist comprising: a digital processing device comprising an operating system configured to perform executable instructions and a memory; a computer program including instructions executable by the digital processing device to create an application comprising: a software module configured to present an interface allowing a first user to create a watchlist comprising a plurality of digital media items, the watchlist having an order indicating a priority for the first user to consume each item; a software module configured to present an interface allowing the first user to rate media items they have consumed; a software module configured to present an interface allowing the first user to recommend one or more consumed media items to a second user, the second user having a social connection to the first user within a social network; a software module configured to present an interface allowing the first user to ask the second user a question pertaining to a media item; a software module configured to present an interface allowing the first user to discuss a media item with the second user; and a software module configured to algorithmically update the watchlist, the update based on user activity including: the second user adding a media item to a watchlist, the second user consuming a media item, the second user rating a media item, the second user recommending a media item, the second user discussing a media item, and aggregated activity of a community of users within the social network.

Also described herein, in certain embodiments, are non-transitory computer-readable storage media encoded with a computer program including instructions executable by a processor to create an application for maintaining an algorithmically sorted watchlist, the application comprising: a software module configured to present an interface allowing a first user to create a watchlist comprising a plurality of digital media items, the watchlist having an order indicating a priority for the first user to consume each item; a software module configured to present an interface allowing the first user to rate media items they have consumed; a software module configured to present an interface allowing the first user to recommend one or more consumed media items to a second user, the second user having a social connection to the first user within a social network; a software module configured to present an interface allowing the first user to ask the second user a question pertaining to a media item; a software module configured to present an interface allowing the first user to discuss a media item with the second user; and a software module configured to algorithmically update the watchlist, the update based on user activity including: the second user adding a media item to a watchlist, the second user consuming a media item, the second user rating a media item, the second user recommending a media item, the second user discussing a media item, and aggregated activity of a community of users within the social network.

Also described herein, in certain embodiments, are computer-implemented methods for maintaining an algorithmically sorted watchlist, the methods comprising: presenting, by a computer, an interface allowing a first user to create a watchlist comprising a plurality of digital media items, the watchlist having an order indicating a priority for the first user to consume each item; presenting, by the computer, an interface allowing the first user to rate media items they have consumed; presenting, by the computer, an interface allowing the first user to recommend one or more consumed media items to a second user, the second user having a social connection to the first user within a social network; presenting, by the computer, an interface allowing the first user to ask the second user a question pertaining to a media item; presenting, by the computer, an interface allowing the first user to discuss a media item with the second user; and algorithmically updating the watchlist, by the computer, the update based on user activity including: the second user adding a media item to a watchlist, the second user consuming a media item, the second user rating a media item, the second user recommending a media item, the second user discussing a media item, and aggregated activity of a community of users within the social network.

Also described herein, in certain embodiments, are computer-implemented systems for maintaining an algorithmically sorted wishlist comprising: a digital processing device comprising an operating system configured to perform executable instructions and a memory; a computer program including instructions executable by the digital processing device to create an application comprising: a software module configured to present an interface allowing a first user to create a wishlist comprising a plurality of items, the wishlist having an order indicating a priority for the first user to acquire each item; a software module configured to present an interface allowing the first user to rate items they have acquired; a software module configured to present an interface allowing the first user to recommend one or more acquired items to a second user, the second user having a social connection to the first user within a social network; a software module configured to present an interface allowing the first user to ask the second user a question pertaining to an item; a software module configured to present an interface allowing the first user to discuss an item with the second user; and a software module configured to algorithmically update the wishlist, the update based on user activity including: the second user adding an item to a wishlist, the second user acquiring an item, the second user rating an item, the second user recommending an item, the second user discussing an item, and aggregated activity of a community of users within the social network.

Also described herein, in certain embodiments, are non-transitory computer-readable storage media encoded with a computer program including instructions executable by a processor to create an application for maintaining an algorithmically sorted wishlist, the application comprising: a software module configured to present an interface allowing a first user to create a wishlist comprising a plurality of items, the wishlist having an order indicating a priority for the first user to acquire each item; a software module configured to present an interface allowing the first user to rate items they have acquired; a software module configured to present an interface allowing the first user to recommend one or more acquired items to a second user, the second user having a social connection to the first user within a social network; a software module configured to present an interface allowing the first user to ask the second user a question pertaining to an item; a software module configured to present an interface allowing the first user to discuss an item with the second user; and a software module configured to algorithmically update the wishlist, the update based on user activity including: the second user adding an item to a wishlist, the second user acquiring an item, the second user rating an item, the second user recommending an item, the second user discussing an item, and aggregated activity of a community of users within the social network.

Also described herein, in certain embodiments, are computer-implemented methods for maintaining an algorithmically sorted wishlist, the methods comprising: presenting, by a computer, an interface allowing a first user to create a wishlist comprising a plurality of items, the wishlist having an order indicating a priority for the first user to acquire each item; presenting, by the computer, an interface allowing the first user to rate items they have acquired; presenting, by the computer, an interface allowing the first user to recommend one or more acquired items to a second user, the second user having a social connection to the first user within a social network; presenting, by the computer, an interface allowing the first user to ask the second user a question pertaining to an item; presenting, by the computer, an interface allowing the first user to discuss an item with the second user; and algorithmically updating the wishlist, by the computer, the update based on user activity including: the second user adding an item to a wishlist, the second user acquiring an item, the second user rating an item, the second user recommending an item, the second user discussing an item, and aggregated activity of a community of users within the social network.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Wishlist

In some embodiments, the platforms, systems, media, and applications described herein include a wishlist, or use of the same. In further embodiments, a wishlist comprises a plurality of items. In still further embodiments, a wishlist comprises a plurality of items in list format. In still further embodiments, a wishlist is a personal list having an order indicating the priority for a user to acquire (e.g., buy, rent, try, borrow, etc.) each item. For example, the user places a high priority on acquisition of items near the top of the list and a lower priority on acquisition of items near the bottom of the list.

Many items are suitable for inclusion in a wishlist. Suitable items include any that can be acquired. Suitable items include, by way of non-limiting examples, goods, services, rights, and experiences, including combinations thereof. In some embodiments, a wishlist does not include any items previously acquired by the user or previously rated by the user.

In some embodiments, a wishlist is an "aggregate wishlist" comprising a de-duplicated summation of a user's social media connections' (e.g., friends') wishlists. In further embodiments, a wishlist is an "aggregate wishlist" further comprising one or more community user wishlists. In still further embodiments, an aggregate wishlist excludes items the user has previously rated. For example, in some embodiments, an aggregate wishlist comprises items, sorted by the same algorithms described herein, into a list that that a user optionally browses as a way to populate their own wishlist. Essentially, in such embodiments, the aggregate wishlist is a list of items that a user might want to add to their own wishlist because their friends (and the community) are discussing, rating, commenting, and adding to their own wishlists. In various embodiments, the aggregate wishlist is referred to as "Trending in your Network" or a "Trendatory" List.

Watchlist

In some embodiments, the platforms, systems, media, and applications described herein include a watchlist, or use of the same. In further embodiments, a watchlist comprises a plurality of items. In still further embodiments, a watchlist comprises a plurality of items in list format. In still further embodiments, a watchlist is a personal list having an order indicating the priority for a user to consume (e.g., watch, listen to, read, experience, etc.) each item. For example, the user places a high priority on consumption of items near the top of the list and a lower priority on consumption of items near the bottom of the list.

Many items are suitable for inclusion in a watchlist. Suitable items include any that can be consumed. In some embodiments, suitable items include media. In further embodiments, suitable items include digital media. Suitable items include, by way of non-limiting examples, e-books, e-magazines, movies, movie trailers, videos, user-generated videos, music videos, albums, songs, TV shows, web shows, podcasts, video games, online courses, including combinations and complications thereof. In some embodiments, a watchlist does not include any items previously consumed by the user or previously rated by the user.

Referring to FIG. 1, in a particular embodiment, a digital media watchlist includes three items. Each item is presented in the watch list with a title 100, a representative graphic icon 101 (such as a logo, character, screen capture, etc.), a GUI element indicating that the item was added to the watchlist 102; and a GUI element allowing the user to rate the item 103 subsequent to watching the item. Importantly, each item is presented in the watch list with information pertaining to behaviors of connected users of a social network relevant to the media item 104 and an indicator of recent updates to the item within the list 105. In this embodiment, the behaviors of the connected users relevant to the first media item include the fact that 10 friends of the user are currently watching the item and 3 friends of the user recently rated the item. Also in this embodiment, the item is indicated as having recently been promoted higher in the priority by 3 places.

Continuing to refer to FIG. 1, in this embodiment, the digital media watchlist includes graphical interface element for each item presented, which represent the sources through which the media can be consumed by the user 106, e.g., HBO, Showtime, iTunes, Netflix, Amazon Instant Video, etc., by virtue of the user's currently active purchased media services and subscriptions. For example, where a user indicates they subscribe to HBO, then HBO availability data would appear in the watchlist when the media item becomes available on HBO.

The first and topmost item, which is the highest priority for the user to watch, is the cable TV series Game of Thrones—Season 5; the second item is the movie Avengers: Age of Ultron; and the third is the movie Tomorrowland.

In some embodiments, a watchlist is an "aggregate watchlist" comprising a de-duplicated summation of a user's social media connections' (e.g., friends') watchlists. In further embodiments, a watchlist is an "aggregate watchlist" further comprising one or more community user watchlists. In still further embodiments, an aggregate watchlist excludes items the user has previously watched and/or rated. For example, in some embodiments, an aggregate watchlist comprises media items, sorted by the same algorithms described herein, into a list that that a user optionally browses as a way to populate their own watchlist. Essentially, in such embodiments, the aggregate watchlist is a list of media items that a user might want to add to their own watchlist because their friends (and the community) are discussing, rating, commenting, and adding to their own watchlists. In various embodiments, the aggregate watchlist is referred to as "Trending in your Network" or a "Trendatory" List.

Social Network

In some embodiments, the platforms, systems, media, and applications described herein include a social network, or use of the same. In some embodiments, a social network is created within a social networking service, for example, a platform to build social networks or social relations among people who share interests, activities, backgrounds, and/or real-life connections. In further embodiments, a social network service includes a representation of each user, often in the form of a profile, his or her social links, and a variety of additional services. In still further embodiments, a social network service allows individuals to create a public profile, to create a list of users with whom to share connections, and view and cross the connections within the system. In some embodiments, connections are made by a reciprocal protocol involving a request, which is followed by an acceptance.

In general, social networking services allow users to share ideas, pictures, posts, activities, events, interests, and the like with people in their network. Suitable social network services include those that are web-based and provide means for users to interact over the Internet, for example, by posts, e-mail, instant messaging, mobile connectivity, photo/video/sharing, and blogging.

By way of non-limiting examples, suitable social networks include: Facebook, Google+, LinkedIn, Instagram, Reddit, Pinterest, Vine, Tumblr, Twitter, Flickr, Friendster, Foursquare, Habbo, Mixi, MyLife, Myspace, Ning, StumbleUpon, Tagged, Tylted, Yammer, delicious, Ello, DeviantArt, and Yelp. By way of further non-limiting examples, suitable social networks include: Nexopia, Badoo, Bebo, Vkontakte, Delphi, Draugiem, Hyves, iWiW, Nasza-Klasa, Soup, Glocals, Skyrock, The Sphere, StudiVZ, Tagged, Tuenti, Xanga, XING, Hi5 and Orkut, Mxit, Cyworld, Mixi, Orkut, Renren, Friendster, Sina Weibo, Wretch, VK, Odnoklassniki, Renren, douban, and LiveJournal.

In some embodiments, the platforms, systems, media, and applications described herein utilize a social network to algorithmically update a wishlist or a watchlist. More specifically, in further embodiments, activity of one or more users within a social network is used to algorithmically update a wishlist or a watchlist. In still further embodiments, it is the activity of a user's social network connections (e.g., friends, contacts, etc.) that is used to algorithmically update their wishlist and/or watchlist. In some embodiments, the social network connections are formed within the application described herein; in other words, the application maintains its own social network. In other embodiments, the social network connections are imported from one or more third-party social networks. In yet other embodiments, the social media connection is based on a contact list uploaded by the user from their phone or computer. In some embodiments, the activity of one or more of a user's social network connections (e.g., friends, contacts, etc.) that is used to algorithmically update their wishlist and/or watchlist includes one or more of: adding an item to a list, consuming or acquiring an item, rating an item, recommending an item, and discussing an item. In further embodiments, an update is based, at least in part, on the distance between the users in a social graph.

In some embodiments, aggregated activity of a community (e.g., population) of users within the social network is used to algorithmically update a wishlist or a watchlist. In further embodiments, the community of users within the social network has a scope configurable by the first user. In some cases, the aggregated activity includes average or media activity levels. In some cases, the aggregated activity includes activity trending in the community.

Ratings

In some embodiments, the platforms, systems, media, and applications described herein include an interface for rating an item, or use of the same. In further embodiments, a user rates to indicate preference or degree of preference. In other embodiments, a user rates to indicate disfavor or degree of disfavor. In some embodiments, a user rates by assigning one or more numbers (e.g., 1, 2, 3, 4, 5, 6, 7, 8, 9, 10 etc.). In other embodiments, a user ranks by assigning one or more letters (e.g., A, B, C, D, F, etc.). In other embodiments, a user rates by assigning one or more stars (e.g., 1 star, 1.5 stars, 2 stars, 2.5 stars, 3 stars, 3.5 stars, 4 stars, 4.5 stars, 5 stars, etc). In yet other embodiments, a user rates an item by comparing it to one or more other items or by ranking (e.g., sorting, ordering, etc.) a plurality of items. In some embodiments, rating an item indicates that a user has previously acquired the item or consumed the item.

In some embodiments, a user provides an overall rating for an item. In other embodiments, a user provides a plurality of ratings for an item, each rating associated with a quality or characteristic of the item. By way of non-limiting example, in a particular embodiment, a user rates a movie by providing separate ratings for plot, acting, soundtrack, and effects.

Recommendations

In some embodiments, the platforms, systems, media, and applications described herein include an interface for recommending an item, or use of the same. In further embodiments, a user recommends an item to one or more particular users. In still further embodiments, a user recommends an item to one or more connections within a social network. In other embodiments, a user recommends an item generally (e.g., to all users). In some embodiments, recommending an item indicates that a user has previously acquired the item or consumed the item.

Questions

In some embodiments, the platforms, systems, media, and applications described herein include an interface for asking questions pertaining to an item, or use of the same. In further embodiments, a user asks questions pertaining to an item to one or more particular users. In still further embodiments, a user asks questions pertaining to an item to one or more connections within a social network. In other embodiments, a user asks questions pertaining to an item generally (e.g., to all users).

Discussions

In some embodiments, the platforms, systems, media, and applications described herein include an interface for discussing an item, or use of the same. In further embodiments, a user discusses an item with one or more particular users. In still further embodiments, a user discusses an item with one or more connections within a social network. In other embodiments, a user discusses an item with generally (e.g., with all users).

Updates

In some embodiments, the platforms, systems, media, and applications described herein include module for updating a watchlist or a wishlist, or use of the same. Many types of updates are suitable, including, by way of non-limiting examples, adding an item to a list, removing an item from a list, moving an item higher in the order of a list, moving an item lower in the order of a list, and transferring an item from one list to another.

In some embodiments, the platforms, systems, media, and applications described herein utilize a social network to algorithmically update a wishlist or a watchlist. More specifically, in further embodiments, activity of one or more users within a social network is used to algorithmically update a wishlist or a watchlist. In still further embodiments, it is the activity of a user's social network connections (e.g., friends, contacts, etc.) that is used to algorithmically update their wishlist and/or watchlist. In some embodiments, the social network connections are formed within the application described herein; in other words, the application maintains its own social network. In other embodiments, the social network connections are imported from one or more third-party social networks. In yet other embodiments, the social media connection is based on a contact list uploaded by the user from their phone or computer.

In some embodiments, the activity of one or more of a user's social network connections (e.g., friends, contacts, etc.) used to algorithmically update a wishlist and/or watchlist includes one or more of: adding an item to a list, consuming or acquiring an item, rating an item, recommending an item, and discussing an item. In further embodiments, an update is based, at least in part, on the distance between the users in a social graph. In a particular embodiment, user activity used to update a list is weighted based on the distance between the user creating the list and the user performing the activity in a social graph.

In some embodiments, aggregated activity of a community (e.g., population) of users within a social network is used to algorithmically update a wishlist or a watchlist. In further embodiments, the community of users within the social network has a scope configurable by the first user. By way of examples, in various embodiments, a user, an administrator, or the system itself, selects the scope of the community by indicating a number of users, a distance between users on a social graph, one or more demographic characteristics, or one or more groups within the social network.

In some embodiments, the aggregated activity of a community of users within a social network used to algorithmically update a wishlist and/or watchlist includes one or more of: adding an item to a list, consuming or acquiring an item, rating an item, recommending an item, and discussing an item. In some cases, the aggregated activity includes average or media activity levels. In some cases, the aggregated activity includes activity trending in the community.

In some embodiments, an update is based, at least in part, on a change in the availability of an item. By way of example, in a wishlist of consumer electronic items, a tablet computing device going up for sale on a large online shopping service, or being reduced in price, is a basis to increase priority of the tablet. By way of further example, in a watchlist of digital media items, a movie becoming viewable on a streaming media service is a basis to increase priority of the movie.

In some embodiments, a change in availability for an item specifically means, where a media item, such as a movie, becomes available for purchase on a media service (i.e., iTunes, Amazon Instant Video, etc.), then that movie is weighed more heavily in the algorithm at that time to highlight that change in availability and status. In further embodiments, this feature is based on what services a particular user subscribes to, for example, where a user indicates they only use iTunes, the user would not get an availability status change where a media item becomes available on Amazon.

In some embodiments, the updates are performed at a regular interval. In various embodiments, the updates are performed, for example, every 1, 5, 10, 20, 30, 40, 50, 60 or more seconds, including increments therein. In various further embodiments, the updates are performed, for example, every 1, 5, 10, 20, 30, 40, 50, 60 or more minutes, including increments therein. In various further embodiments, the updates are performed, for example, every 1, 2, 4, 6, 8, 10, 20, 24 or more hours, including increments therein. In various further embodiments, the updates are performed, for example, every day, week, or month. In other embodiments, the updates are performed substantially continuously. In some embodiments, the updates are performed at potentially irregular intervals, for example, when relevant user activity pertaining to one or more items on a list is detected.

Digital Processing Device

In some embodiments, the platforms, systems, media, and applications described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 2:
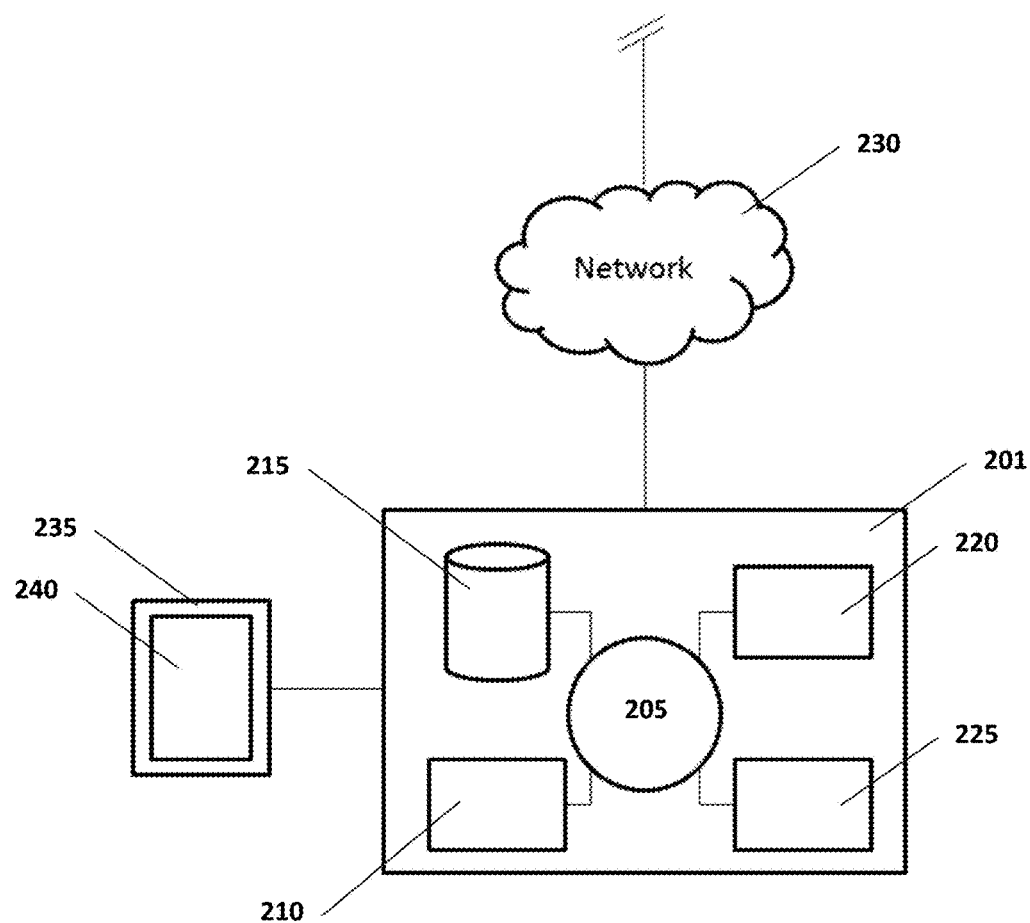
FIG. 2 shows a non-limiting example of a digital processing device; in this case, a device with one or more CPUs, a memory, a communication interface, and a display.

Referring to FIG. 2, in a particular embodiment, an exemplary digital processing device 201 is programmed or otherwise configured to provide and maintain an algorithmically sorted watchlist and/or wishlist. The device 201 can regulate various aspects of the watchlists and/or wishlists of the present disclosure, such as, for example, the order of the items in the lists. In this embodiment, the digital processing device 201 includes a central processing unit (CPU, also "processor" and "computer processor" herein) 205, which can be a single core or multi core processor, or a plurality of processors for parallel processing. The digital processing device 201 also includes memory or memory location 210 (e.g., random-access memory, read-only memory, flash memory), electronic storage unit 215 (e.g., hard disk), communication interface 220 (e.g., network adapter) for communicating with one or more other systems, and peripheral devices 225, such as cache, other memory, data storage and/or electronic display adapters. The memory 210, storage unit 215, interface 220 and peripheral devices 225 are in communication with the CPU 205 through a communication bus (solid lines), such as a motherboard. The storage unit 215 can be a data storage unit (or data repository) for storing data. The digital processing device 201 can be operatively coupled to a computer network ("network") 230 with the aid of the communication interface 220. The network 230 can be the Internet, an internet and/or extranet, or an intranet and/or extranet that is in communication with the Internet. The network 230 in some cases is a telecommunication and/or data network. The network 230 can include one or more computer servers, which can enable distributed computing, such as cloud computing. The network 230, in some cases with the aid of the device 101, can implement a peer-to-peer network, which may enable devices coupled to the device 101 to behave as a client or a server.

Continuing to refer to FIG. 2, the CPU 205 can execute a sequence of machine-readable instructions, which can be embodied in a program or software. The instructions may be stored in a memory location, such as the memory 210. The instructions can be directed to the CPU 205, which can subsequently program or otherwise configure the CPU 205 to implement methods of the present disclosure. Examples of operations performed by the CPU 205 can include fetch, decode, execute, and write back. The CPU 205 can be part of a circuit, such as an integrated circuit. One or more other components of the device 201 can be included in the circuit. In some cases, the circuit is an application specific integrated circuit (ASIC) or a field programmable gate array (FPGA).

Continuing to refer to FIG. 2, the storage unit 215 can store files, such as drivers, libraries and saved programs. The storage unit 215 can store user data, e.g., user preferences and user programs. The digital processing device 201 in some cases can include one or more additional data storage units that are external, such as located on a remote server that is in communication through an intranet or the Internet.

Continuing to refer to FIG. 2, the digital processing device 201 can communicate with one or more remote computer systems through the network 230. For instance, the device 201 can communicate with a remote computer system of a user. Examples of remote computer systems include personal computers (e.g., portable PC), slate or tablet PCs (e.g., Apple® iPad, Samsung® Galaxy Tab), telephones, Smart phones (e.g., Apple® iPhone, Android-enabled device, Blackberry®), or personal digital assistants.

Methods as described herein can be implemented by way of machine (e.g., computer processor) executable code stored on an electronic storage location of the digital processing device 101, such as, for example, on the memory 210 or electronic storage unit 215. The machine executable or machine readable code can be provided in the form of software. During use, the code can be executed by the processor 205. In some cases, the code can be retrieved from the storage unit 215 and stored on the memory 210 for ready access by the processor 205. In some situations, the electronic storage unit 215 can be precluded, and machine-executable instructions are stored on memory 210.

Non-Transitory Computer Readable Storage Medium

In some embodiments, the platforms, systems, media, and applications disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and applications disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 3:
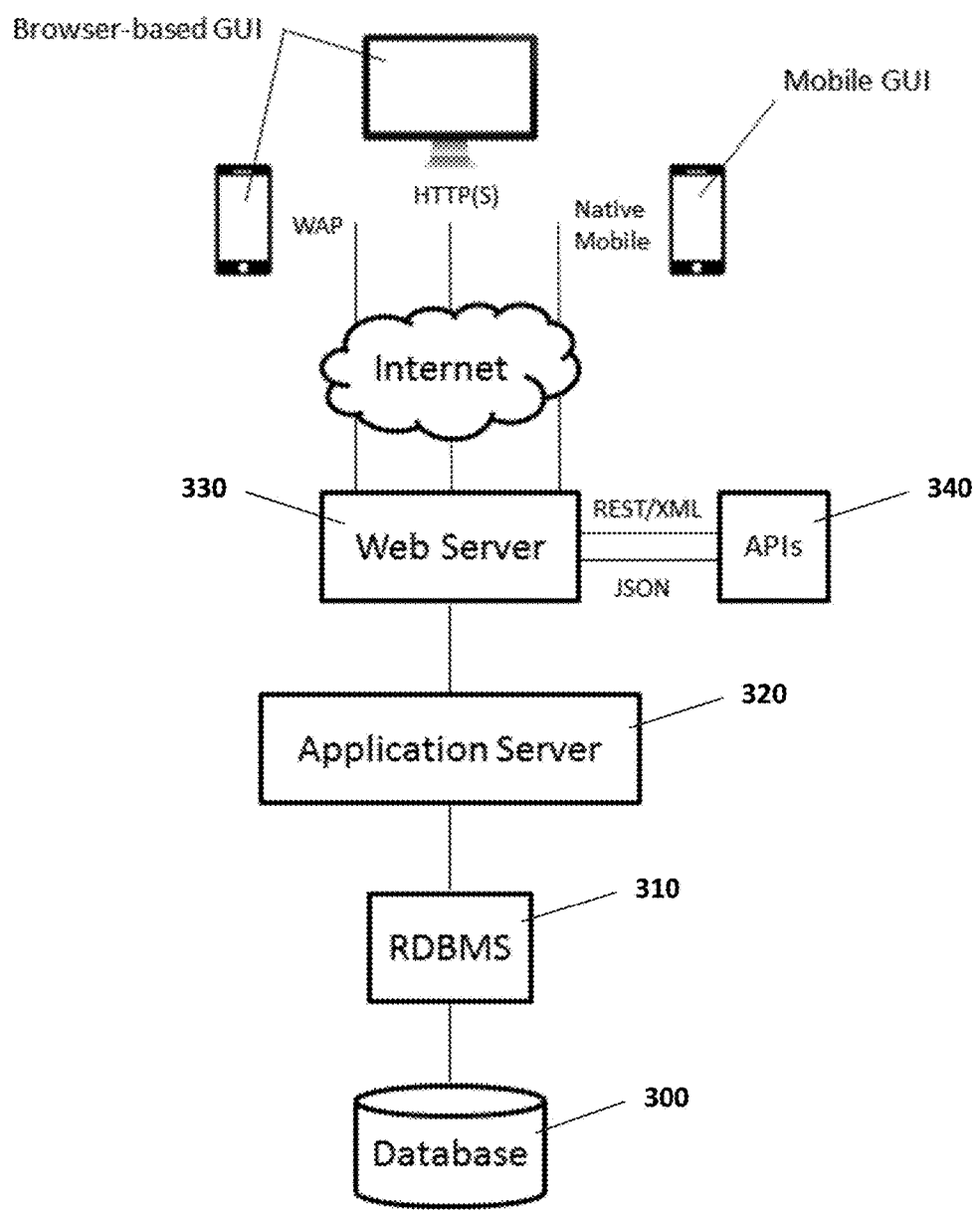
FIG. 3 shows a non-limiting example of a web/mobile application provision system; in this case, a system providing browser-based and/or native mobile user interfaces.

Referring to FIG. 3, in a particular embodiment, an application provision system comprises one or more databases 300 accessed by a relational database management system (RDBMS) 310. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 320 (such as Java servers, NET servers, PHP servers, and the like) and one or more web servers 330 (such as Apache, IIS, GWS and the like). The web server(s) optionally expose one or more web services via app application programming interfaces (APIs) 340. Via a network, such as the Internet, the system provides browser-based and/or mobile native user interfaces.

Figure 4:
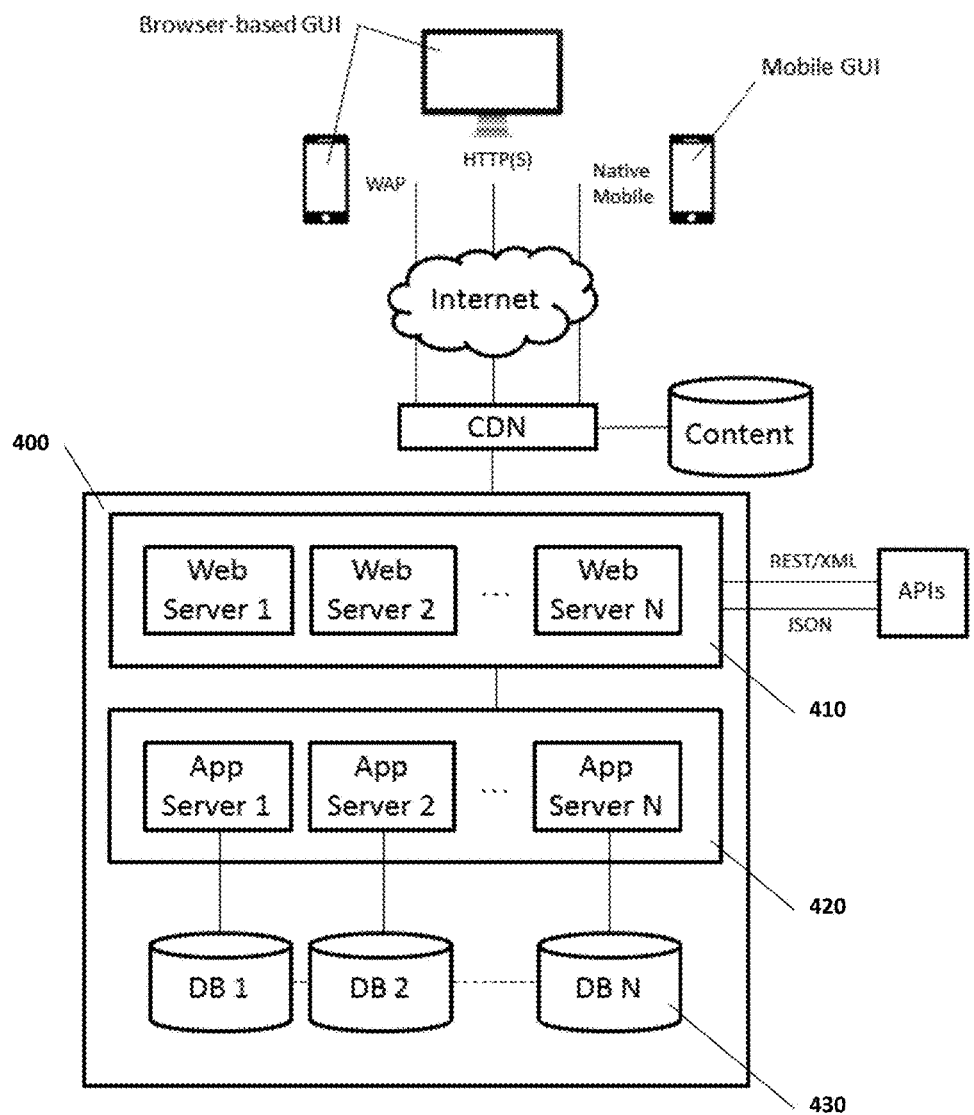
FIG. 4 shows a non-limiting example of a cloud-based web/mobile application provision system; in this case, a system comprising an elastically load balanced, auto-scaling web server and application server resources as well synchronously replicated databases.

Referring to FIG. 4, in a particular embodiment, an application provision system alternatively has a distributed, cloud-based architecture 400 and comprises elastically load balanced, auto-scaling web server resources 410 and application server resources 420 as well synchronously replicated databases 430.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony PSP™ browser.

Software Modules

In some embodiments, the platforms, systems, media, and applications disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and applications disclosed herein include one or more databases, or use of the same. In view of the disclosure provided herein, those of skill in the art will recognize that many databases are suitable for storage and retrieval of user, connection, list, and item information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A computer-implemented system for maintaining an algorithmically sorted watchlist comprising:
  a) a digital processing device comprising an operating system configured to perform executable instructions and a memory;
  b) a computer program including instructions executable by the digital processing device to create an application, the application configured for:
    i) presenting an interface allowing a first user to create a watchlist comprising a plurality of digital media items, the watchlist having an order indicating a priority for the first user to consume each item;
    ii) presenting an interface allowing the first user to rate media items they have consumed;
    iii) presenting an interface allowing the first user to recommend one or more consumed media items to a second user, the second user having a social connection to the first user within a social network;
    iv) presenting an interface allowing the first user to ask the second user a question pertaining to a media item;
    v) presenting an interface allowing the first user to discuss a media item with the second user; and
    vi) algorithmically updating the watchlist, the update based on social graph distance between the first user and the second user and user activity including: the second user adding a media item to a watchlist, the second user consuming a media item, the second user rating a media item, the second user recommending a media item, the second user discussing a media item, and aggregated activity of a community of users within the social network, wherein a scope of the community of users is customizable by the first user indicating a number of users, a distance between users on the social graph, one or more demographic characteristics, or one or more groups within the social network.

2. The system of claim 1, wherein the media items comprise one or more: TV series, TV series seasons, TV episodes, movies, movie trailers, music videos, or user generated videos.

3. The system of claim 1, wherein the watchlist excludes items previously consumed by the first user or previously rated by the first user.

4. The system of claim 1, wherein the update is performed at least once an hour, once a minute, or once a second.

5. The system of claim 1, wherein the community of users within the social network has a scope configurable by the first user.

6. The system of claim 1, wherein the social media connection is formed within the application.

7. The system of claim 1, wherein the social media connection is imported from one or more third-party social networks.

8. The system of claim 1, wherein the update is based on a change in the availability of a media item.

9. The system of claim 1, wherein the update comprises one or more selected from the group consisting of: adding an item to the watchlist, removing an item from the watchlist, moving an item higher in the order, and moving an item lower in the order.

10. The system of claim 1, wherein the aggregated activity of a community of users comprises an average rate of, or trend in: adding a media item to a watchlist by users of the community, consuming a media item by users of the community, rating a media item by users of the community, recommending a media item by users of the community, or discussing a media item by users of the community.

11. The system of claim 1, wherein algorithmically updating the watchlist applies a weight to different types of user activity to algorithmically the watchlist.

12. The system of claim 1, wherein algorithmically updating the watchlist also updates a user interface of the application to indicate, for each media item the user activity used to algorithmically the watchlist.

13. Non-transitory computer-readable storage media encoded with a computer program including instructions executable by a processor to create an application for maintaining an algorithmically sorted watchlist, the application configured for:
  a) presenting an interface allowing a first user to create a watchlist comprising a plurality of digital media items, the watchlist having an order indicating a priority for the first user to consume each item;

b) presenting an interface allowing the first user to rate media items they have consumed;

c) presenting an interface allowing the first user to recommend one or more consumed media items to a second user, the second user having a social connection to the first user within a social network;

d) presenting an interface allowing the first user to ask the second user a question pertaining to a media item;

e) presenting an interface allowing the first user to discuss a media item with the second user; and f) algorithmically updating the watchlist, the update based on social graph distance between the first user and the second user and user activity including: the second user adding a media item to a watchlist, the second user consuming a media item, the second user rating a media item, the second user recommending a media item, the second user discussing a media item, and aggregated activity of a community of users within the social network, wherein a scope of the community of users is customizable by the first user indicating a number of users, a distance between users on the social graph, one or more demographic characteristics, or one or more groups within the social network.

14. A computer-implemented system for maintaining an algorithmically sorted wishlist comprising:

a) a digital processing device comprising an operating system configured to perform executable instructions and a memory;

b) a computer program including instructions executable by the digital processing device to create an application, the application configured for:

i) presenting an interface allowing a first user to create a wishlist comprising a plurality of items, the wishlist having an order indicating a priority for the first user to acquire each item;

ii) presenting an interface allowing the first user to rate items they have acquired;

iii) presenting an interface allowing the first user to recommend one or more acquired items to a second user, the second user having a social connection to the first user within a social network;

iv) presenting an interface allowing the first user to ask the second user a question pertaining to an item;

v) presenting an interface allowing the first user to discuss an item with the second user; and vi) algorithmically updating the watchlist, the update based on social graph distance between the first user and the second user and user activity including: the second user adding a media item to a watchlist, the second user consuming a media item, the second user rating a media item, the second user recommending a media item, the second user discussing a media item, and aggregated activity of a community of users within the social network, wherein a scope of the community of users is customizable by the first user indicating a number of users, a distance between users on the social graph, one or more demographic characteristics, or one or more groups within the social network.

15. The system of claim 14, wherein the items comprise one or more: goods, services, or experiences.

16. The system of claim 14, wherein the wishlist excludes items previously acquired by the first user or previously rated by the first user.

17. The system of claim 14, wherein the wishlist excludes items by the first user.

18. The system of claim 14, wherein the update is performed at least once an hour, once a minute, or once a second.

19. The system of claim 14, wherein the community of users within the social network has a scope configurable by the first user.

20. The system of claim 14, wherein the social media connection is formed within the application.

21. The system of claim 14, wherein the social media connection is imported from one or more third-party social networks or a contact list of the first user.

22. The system of claim 14, wherein the update is based on a change in the availability of an item.

23. The system of claim 14, wherein the update comprises one or more selected from the group consisting of: adding an item to the wishlist, removing an item from the wishlist, moving an item higher in the order, and moving an item lower in the order.

24. The system of claim 14, wherein the aggregated activity of a community of users comprises an average rate of, or trend in: adding an item to a wishlist by users of the community, acquiring an item by users of the community, rating an item by users of the community, recommending an item by users of the community, or discussing an item by users of the community.

25. The system of claim 14, wherein algorithmically updating the wishlist applies a weight to different types of user activity to algorithmically update the wishlist.

26. The system of claim 14, wherein algorithmically updating the wishlist also updates a user interface of the application to indicate, for each item, the user activity used to algorithmically the wishlist.

27. Non-transitory computer-readable storage media encoded with a computer program including instructions executable by a processor to create an application for maintaining an algorithmically sorted wishlist, the application configured for:

a) presenting an interface allowing a first user to create a wishlist comprising a plurality of items, the wishlist having an order indicating a priority for the first user to acquire each item;

b) presenting an interface allowing the first user to rate items they have acquired;

c) presenting an interface allowing the first user to recommend one or more acquired items to a second user, the second user having a social connection to the first user within a social network;

d) presenting an interface allowing the first user to ask the second user a question pertaining to an item;

e) presenting an interface allowing the first user to discuss an item with the second user; and f) algorithmically updating the watchlist, the update based on social graph distance between the first user and the second user and user activity including: the second user adding a media item to a watchlist, the second user consuming a media item, the second user rating a media item, the second user recommending a media item, the second user discussing a media item, and aggregated activity of a community of users within the social network, wherein a scope of the community of users is customizable by the first user indicating a number of users, a distance between users on the social graph, one or more demographic characteristics, or one or more groups within the social network.

* * * * *